(12) United States Patent  
Homer et al.

(10) Patent No.: US 7,492,579 B2
(45) Date of Patent: Feb. 17, 2009

(54) COMPUTER WITH ADJUSTABLE DISPLAY

(75) Inventors: Steven S. Homer, Tomball, TX (US); Paul Doczy, Cypress, TX (US); Mark Solomon, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 889 days.

(21) Appl. No.: 10/661,717

(22) Filed: Sep. 12, 2003

(65) Prior Publication Data

US 2005/0057893 A1    Mar. 17, 2005

(51) Int. Cl.
 *G06F 1/16* (2006.01)
(52) U.S. Cl. .................. 361/683; 361/681; 361/686; 710/303; 710/304; 312/223.1; 312/223.2
(58) Field of Classification Search ......... 361/679–686, 361/752, 755; 16/292, 297, 362; 710/303, 710/304; 312/223.1, 223.2
 See application file for complete search history.

(56) References Cited

U.S. PATENT DOCUMENTS

| | | | |
|---|---|---|---|
| 5,436,792 A | * | 7/1995 | Leman et al. ............... 361/686 |
| 5,668,570 A | | 9/1997 | Ditzik |
| 6,005,767 A | | 12/1999 | Ku et al. |
| 6,016,248 A | | 1/2000 | Anzai et al. |
| 6,219,681 B1 | * | 4/2001 | Hawkins et al. ............. 708/100 |
| 6,282,082 B1 | | 8/2001 | Armitage et al. |
| 6,366,935 B2 | * | 4/2002 | Hawkins et al. ............. 708/100 |
| 6,384,811 B1 | | 5/2002 | Kung et al. |
| 6,575,419 B1 | * | 6/2003 | Masuda et al. ............. 248/371 |
| 2002/0145847 A1 | * | 10/2002 | Crosby ...................... 361/683 |
| 2003/0021083 A1 | * | 1/2003 | Landry et al. ............... 361/683 |
| 2004/0047115 A1 | * | 3/2004 | Helot et al. ................. 361/681 |
| 2004/0090742 A1 | * | 5/2004 | Son et al. .................... 361/686 |

\* cited by examiner

*Primary Examiner*—Jayprakash N Gandhi
*Assistant Examiner*—Anthony Q Edwards

(57) ABSTRACT

A computing system comprises a docking station having a base, a carrier separate from the base, and a nonlinear rigid mounting arm mechanically connecting the base to the carrier, wherein the mounting arm has a first end that pivotally connects to the base and a second end that pivotally connects to the carrier; an electronic display removably connectable to the carrier; and a keyboard in communication with the display.

12 Claims, 6 Drawing Sheets

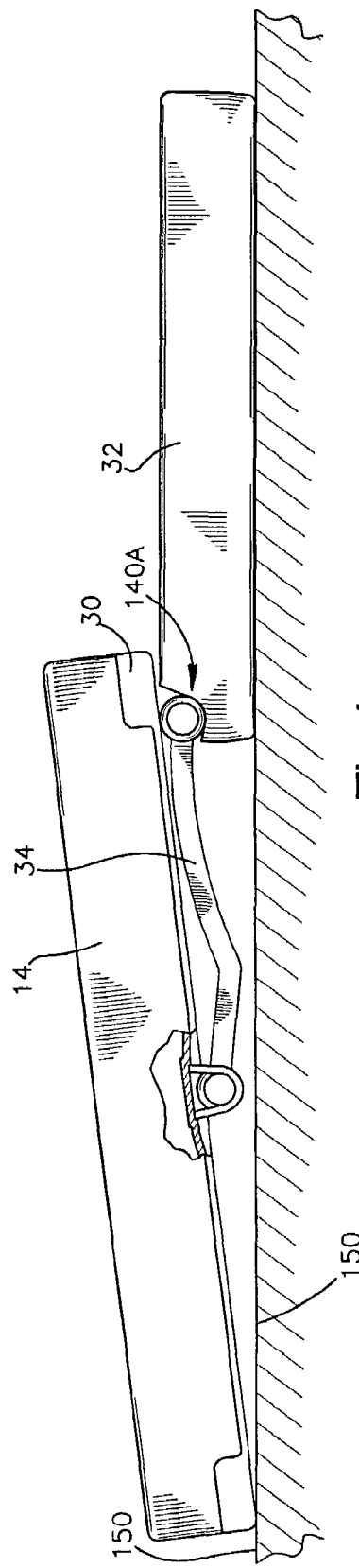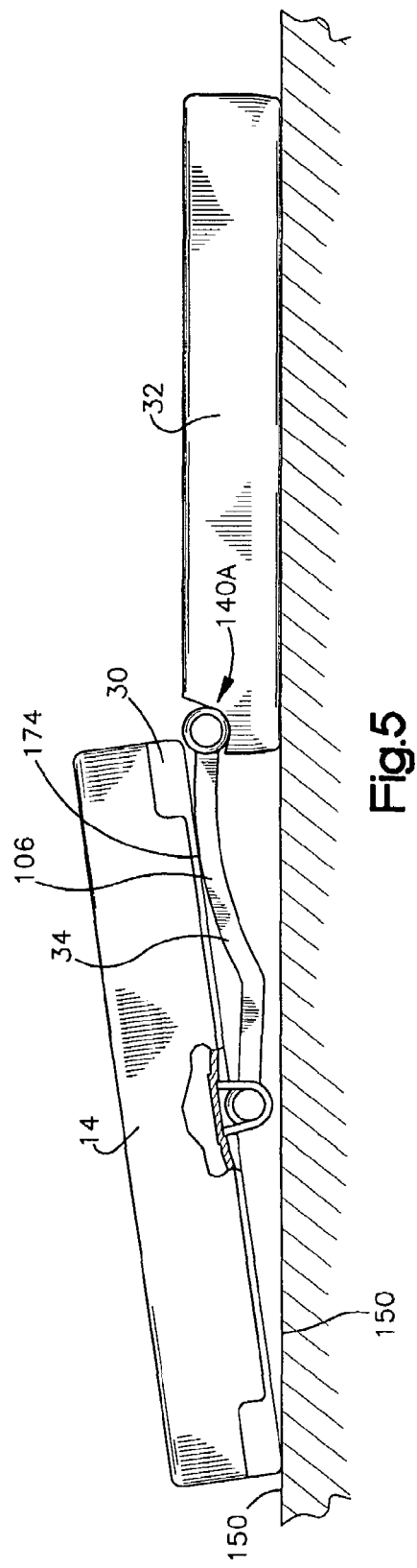

COMPUTER WITH ADJUSTABLE DISPLAY

BACKGROUND

Portable computing devices (such as computers, labtops, notebooks, and personal data organizers (PDA)) are often unitary devices having a clam-shell configuration. These devices have a base portion and a display. The base portion often includes a keyboard, hard drive, floppy drive, central processing unit, and memory; and the display includes a viewing screen or panel. In the clam-shell configuration, the display pivotally connects to the base and moves between open and closed positions. In the closed position, the base and display lay on top of each other so the computing device has a reduced, compact size. In the open position, the display is disposed at an angle with respect to the base so the screen can be accessed or viewed.

In some portable computing devices, the display includes a touch sensitive screen for inputting information. By touching specific areas of the screen, information can be entered into the computing device. Some PDAs, for example, do not have a keyboard and use a stylus for interacting with the screen and entering information. Other computing devices use both a keyboard and screen for entering data.

Since the display is rigidly fixed to the base about a single axis, the clam-shell design may have limitations. In some instances, for example, the user may have to open the display to a large or unusual viewing angle to conveniently view the screen. Such angles may not be available with the clam-shell design. In other instances, it may be difficult to position the screen at a preferred viewing distance or at a preferred angle to eliminate distracting reflections. In still other instances, the screen may have to be adjusted to provide an ergonomic writing position, especially when the screen itself is used as a keyboard or writing surface.

In order to meet demands of users, portable computing devices are becoming more adaptable and sophisticated. In some instances, these devices have a variety of modular and multi-task capabilities that are not available with the clam-shell configuration. In some notebook computers, for example, the display may have to be positioned at various angles and orientations with respect to the base in order to function as both as a display for entering data via a keyboard or as a display for entering data with a stylus.

SUMMARY

In one embodiment, a computing system comprises a docking station having a base, a carrier separate from the base, and a nonlinear rigid mounting arm mechanically connecting the base to the carrier, wherein the mounting arm has a first end that pivotally connects to the base and a second end that pivotally connects to the carrier; an electronic display removably connectable to the carrier; and a keyboard in communication with the display.

In another embodiment, a method comprises providing a computer base housing electronic components; providing a computer display housing electronic components; mechanically attaching the base to the display with a curved mounting arm; and rotating the display to a vertical position over the base such that a center of gravity of the display is between a first pivot point at the base and a second pivot point at the display.

Other embodiments and variations of these embodiments are shown and taught in the accompanying drawings and detailed description.

BRIEF DESCRIPTION OF THE DRAWINGS

FIG. 4 is a side view of a display in a down portrait position when mounted in a docking station.

FIG. 5 is a side view of a display in a down landscape position when mounted in a docking station.

DETAILED DESCRIPTION

Figure 1:
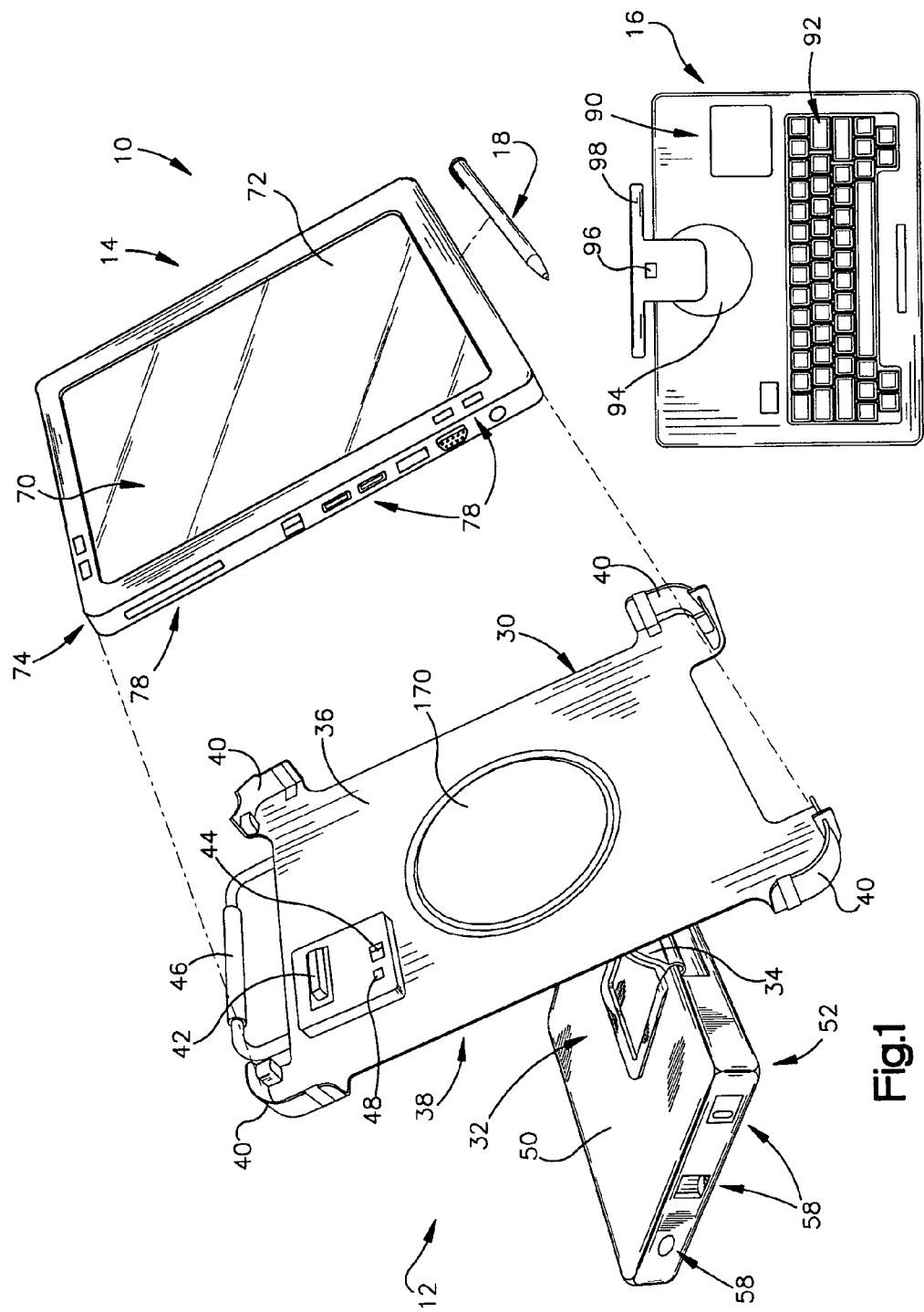
FIG. 1 is an exploded view of a computing system in accordance with an exemplary embodiment of the present invention.
Figure 2:
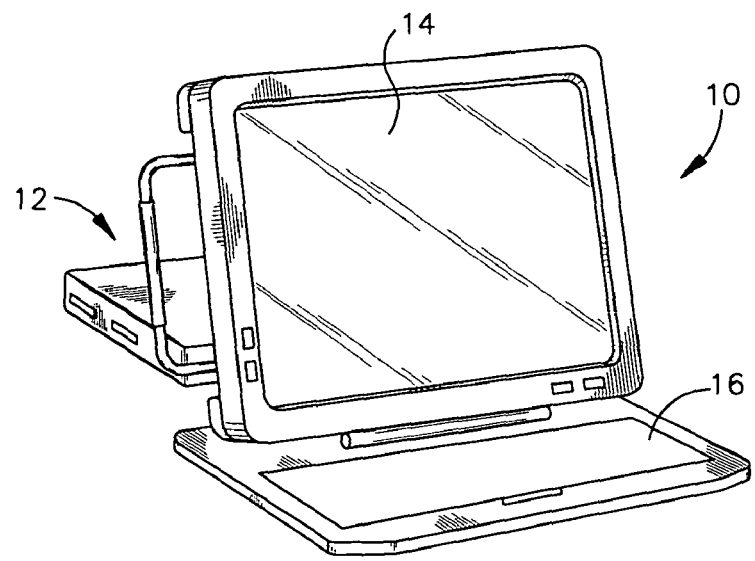
FIG. 2 is a perspective view of an assembled computing system.

FIGS. 1 and 2 show a computing system 10 in accordance with one exemplary embodiment. The computing system 10 generally comprises a docking station 12, a display 14, a keyboard 16, and a stylus 18. For convenience of illustration, a tablet personal computer (PC) system is illustrated in and discussed in connection with FIGS. 1 and 2. Embodiments in accordance with the present invention, though, are not limited to tablet PC systems or any particular type of computing system. By way of example, embodiments in accordance with the present invention include, but are not limited to, computers (portable and non-portable), labtops, notebooks, PDAs, tablet PCs, and other electronic devices and systems.

The docking station 12 generally comprises a stand or carrier 30, a base 32, and a viewing or mounting arm 34 connecting the carrier to the base. The carrier 30 is adapted to receive and hold the display 14 and provide electrical communication or coupling between the display 14 and the base 32. By way of example, the carrier 30 has a front surface 36 and a back surface 38 and may comprise a generally rectangular or square body having four brackets 40 extending outwardly from the front surface. Brackets 40 are positioned at respective corners of the carrier 30 and are adapted to align and hold the display in the carrier 30. The carrier also has a connector 42 and restraining latch 44 to connect with the display 14, a release handle 46, and an ejection pin 48 to disconnect the display from the carrier when the handle 44 is pulled.

The base 32 has a generally rectangular or square body with an upper or top surface 50 and a lower or bottom surface 52 that is positionable on a support surface. The base 32 may be configured in many different ways and may comprise and house many different components. By way of example only, the base can house and comprise a central processing unit (CPU), hard drive, memory, infrared ports, disk drives, PC card slots, batteries, USB ports, power connectors, monitor and display connectors, multibays, network connectors, CompactFlash card slots, power connectors, and other input/output (I/O) ports, just to name a few examples. Many of these features are generally shown at 58.

The display 14 generally comprises a front surface 70 with a view screen or panel 72 and a back surface 74. The screen 72 may be a touch sensitive screen that both displays data and inputs data when touched or activated. In other embodiments, the screen may only be capable of displaying information. In such embodiments, information can be input via keyboard 16, a mouse, voice activation, or other means. By way of example, screen 72 may be a backlit color liquid crystal display (LCD). Data may be entered through the screen using, for example, the stylus 18 or a user's finger. Images that appear on the screen provide a graphical user interface (GUI) and may be controlled with software (including handwriting recognition software) such that displayed images may be contacted or activated to input, edit, alter, or otherwise access information. When a user touches or activates a designated area on the screen, for example, the touch sensitive screen transmits a signal to the CPU. The display 14 may further include a retention mechanism for holding the stylus 18.

The display 14, in some embodiments, can be quite electronically sophisticated and may function as a computer, such as a stand-alone personal portable PC. By way of example only, the display 14 can house and comprise a central processing unit (CPU), hard drive, memory, infrared ports, disk drives, PC card slots, batteries, USB ports, power connectors, keyboard or monitor connectors, multibays, network connectors, CompactFlash card slots, power connectors, other input/output (I/O) ports, and numerous buttons and switches (such as Enter, Esc, Tab, Menu, Power, etc.), just to name a few examples. Many of these features are generally shown at 78.

The keyboard 16 generally comprises a top surface 90 with a plurality of keys 92 and may comprise or house a number of features. By way of example only, the keyboard 16 may house and comprise a rotation disk 94 (to rotate the display 14 while connected to the keyboard), connector 96 (to connect the keyboard to the display 14), and tilt adjustment 98 (to tilt the display 14 forward or backwards while connected to the keyboard), just to name a new examples. Further, as best shown in FIG. 2, the keyboard 16 may be both mechanically and/or electrically coupled to the display 14. For instance, the keyboard may only be electrically coupled to the display. In this latter configuration, the keyboard may be directly connected to the display (via an electrical connection, such as a cable or wire for example) or not physically connected (with data transmission occurring via wireless technology, via a remote location, or via other electronic devices, for example).

Figures 6, 7:
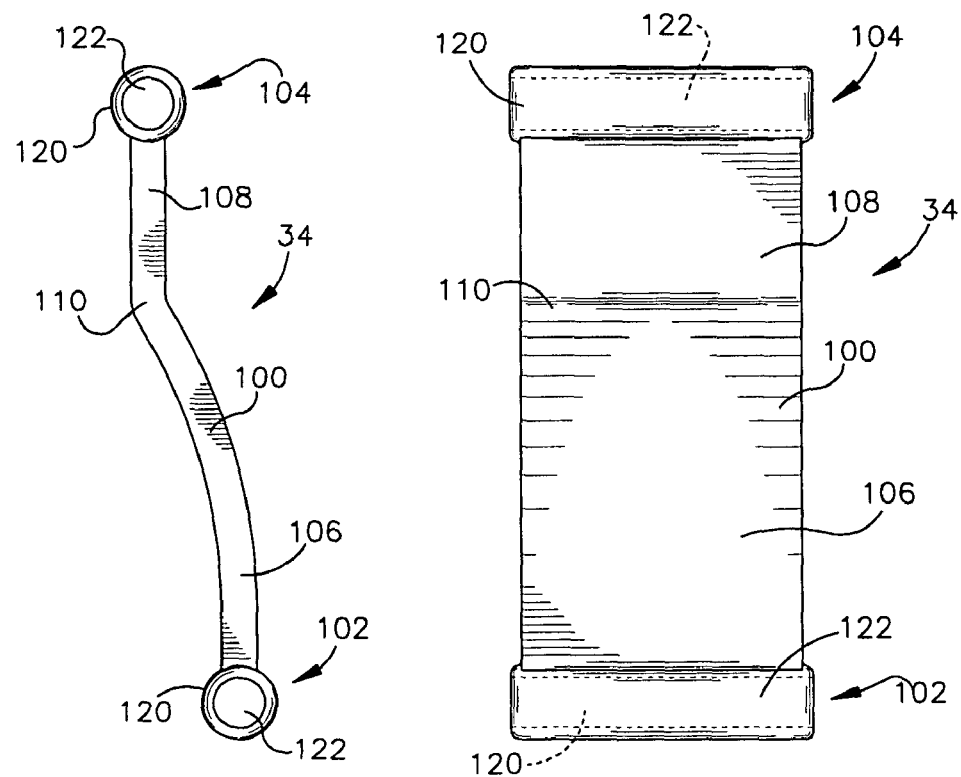
FIG. 6 is a side view of a mounting arm.
FIG. 7 is a front view of the mounting arm of FIG. 6.
Figure 3:
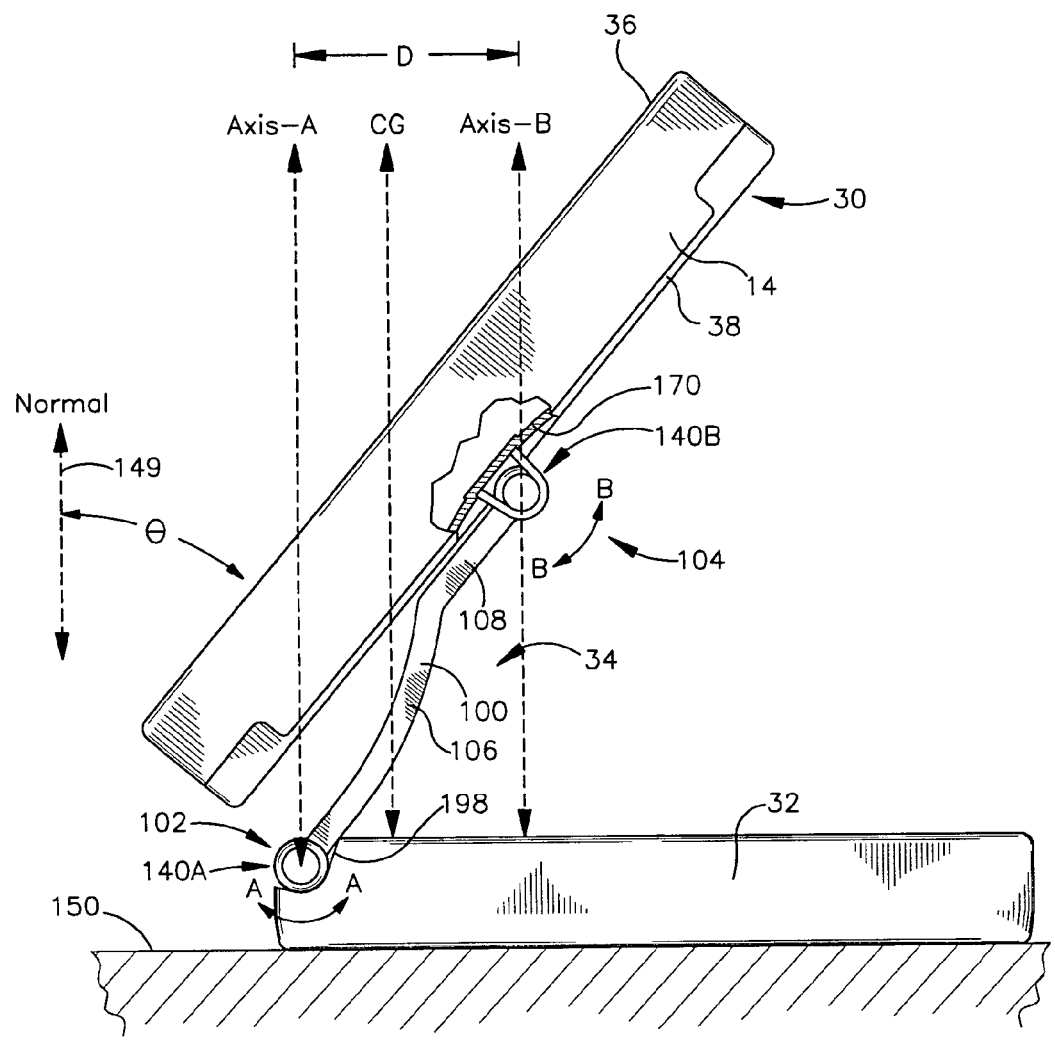
FIG. 3 is a side view of a display in an up position when mounted in a docking station.

Turning now to FIGS. 3, 6, and 7, the mounting arm 34 is shown in more detail. The mounting arm 34 has an elongated, nonlinear rigid body 100 that extends from a first end 102 to a second end 104. The body 100 comprises two different and distinct portions: a first portion 106 extending from first end 102 and a second portion 108 extending from second end 104. The first portion 106 and the second portion 108 meet at a junction 110.

In one preferred embodiment, the first portion 106 and the second portion 108 have different shapes. In side view (shown best in FIG. 6), the first portion 106 has a generally curved shape with a constant degree of curvature, and the second portion 108 has a generally straight shape. Together, these two portions form a generally "S" shape. In front view (shown best in FIG. 7), the first and second portions generally have an elongated rectangular shape.

The length of first portion 106 is not equal to the length of second portion 108. For example, the length of the first portion is shown to be greater than the length of the second portion. Further, the first and second ends, 102 and 104 respectively, of the mounting arm 34 generally have a rounded or cylindrically shaped head 120 with an internal bore 122 extending through the head.

The mounting arm 34 can have various shapes and still be within the scope of the invention. By way of example only, the second portion 108 could be slightly curved and have a curvature that is less great than a curvature of the first portion 106. Further, the first portion could be more straight while the second portion is more curved. Alternatively, both the first and second portions could be straight, and the junction 110 could be curved to offset the first and second portions so the mounting arm is nonlinear. Further, the second portion 108 could have a length greater than or equal to the first portion 106. Further yet, the first portion could have a length greater than or equal to the second portion 108. Alternatively, the mounting arm may comprise more than two different sections. The mount arm may have three sections. For example, two straight sections may be joined by a curved section. Even further, the degree of curvature for either the first or second portions does not necessarily have to be constant. Either or both portions, for example, could have an increasing or decreasing degree of curvature. As illustrated and described then, the mounting arm 34 can have various shapes and sizes to form a nonlinear configuration.

Preferably, the mounting arm 34 is formed of a strong, lightweight, and rigid material, such as metal or polymer. By way of example, the mounting arm may be die cast and formed of magnesium. Further, the mounting arm may be formed of separate sections and connected together or formed as a single unitary integral member. Further yet, as noted, the mounting arm may have various sizes and length. By way of example and not to limit the invention to any particular size, the mounting arm may have a length of about 100 mm, a width of about 50 mm, and a thickness of about 7 mm. In these exemplary measurements, the first portion 106 could have length about twice the second portion 108. As such, the first portion could have a length of about 70 mm, while the second portion has a length of about 30 mm. Further yet, the mounting arm 34 can be hollow and house electrical pathways or connectors to electrically couple the display 14 to base 32.

Looking to FIG. 3, the mounting arm 34 couples the display 14 to the base 32 with a hinged or pivotal connection. A first hinge connection 140A can connect the first end 102 to the base 32, and a second hinge connection 140B can connect the second end 104 to the display 14 or, more particularly, to the back surface 38 of carrier 30. Various hinge-type connections can be used. By way of example, the hinge connection can use a cylinder and sleeve connection. For example, bore 122 in head 120 of both first end 102 and second end 104 can be shaped and sized to receive a cylindrical shaft or protrusion that is mounted to the base or carrier. Alternatively, for example, head 120 can be adapted to be received in a cylindrical or round sleeve that is mounted to the base or carrier.

The hinge connection can further utilize friction as a means to maintain the mounting arm in locked or sturdy positions. For example, when sufficient rotational force or torque is applied to display 14 or carrier 30, the frictional forces in hinge 140A can be overcome so the display or carrier can rotate clockwise or counterclockwise as shown along arrows A-A. Further, when sufficient rotational force or torque is applied to display 14 or carrier 30, the frictional forces in hinge 140B can be overcome so the display or carrier can rotate clockwise or counterclockwise as shown along arrows B-B. In either case, once the user has released the display or carrier, the frictional forces in the hinges 140A and 140B can maintain the display, carrier, and base in the desired position.

The mounting arm 34 couples the display 14 to the base 32 such that the display may be moved to a plurality of different positions. Both the height and angle of the display relative to the base may be adjusted. Generally, these positions can be divided into two main categories: vertical or up positions (i.e., those positions in which the display is not resting on a support structure, including the base itself) and horizontal or down positions (i.e., those positions in which the display is resting on a support structure, such as the base and/or other support).

FIG. 3 shows an example of one such up position. In this figure, the display 14 is suspended above the base 32. In this position, the mounting arm 34 is rotated clockwise about hinge connection 140A until the mounting arm 34 hits a stop 198. Stop 198 prevents the mounting arm from rotating farther. This stop 198 can have numerous embodiments and may, for example, be provided as a ridge, wall, tab, or stop member on the base 32. Alternatively, a stop mechanism can be provided in the hinge connection 140A. When the mounting arm 34 is fully rotated in the clockwise direction about hinge connection 140A (as shown in FIG. 3), the front surface 36 forms an angle θ with a line 149 normal or perpendicular to the support surface 150.

A stop mechanism can be configured to stop rotation of the mounting arm 34 at various locations and angles. For example and not to limit the invention, angle θ could be between about 10°-40°. The exemplary embodiment in FIG. 3 has an angle θ of about 38°.

When the mounting arm 34 is positioned against the stop 198, the hinge connection 140A and hinge connection 140B are displaced a horizontal distance D. This distance is measured between axis-A (a perpendicular axis extending through hinge connection 140A) and axis-B (a perpendicular axis extending through hinge connection 140B) along support surface 150. In this configuration, the center of gravity, CG, for the display 14 and carrier 30 is between two parallel axes, the axis-A and axis-B. Further, as shown, the back surface 38 of carrier 30 is parallel to and rests flush with section portion 108 of mounting arm 34. Since the center of gravity, CG, is between axis-A and axis-B, the display remains in a stable, solid, fixed position. As such, the display will not tend to fall forward or backward. Further, the display and base are not prone to easily knock-over or otherwise accidentally or inadvertently fall.

Preferably, the center of gravity, CG, of the display 14 and/or carrier 30 occurs somewhere between the axis-A and axis-B while the display is in an up position. When the CG is between these two axes (regardless whether the display is in a portrait position, landscape position, or other position), the weight of the display enables the display to remain or stay positioned between the axes and to have an over-center orientation. In other words, while the display is in a vertical position or up position and the CG is between the axes, the weight of the display itself keeps the display in position and prevents movement. With this orientation in the up position, the frictional forces required in the hinge connections 140A and 140B can be relatively low. Further then, the amount of rotational force or torque required to move the display or base about hinge connections 140A or 140B is relatively lower. A user, then, can impart a smaller amount of force or exertion to move or maneuver the display from the up position to the down position or from the down position to the up position.

In one embodiment, the frictional or rotational force required to move the mounting arm about the hinge connections 104A and 104B may be equal. In another embodiment, these frictional or rotational forces are not equal. Specifically, the frictional or rotational force required to move the display 14 about hinge connection 140B is less than the frictional or rotational force required to move the display 14 about hinge connection 140A. As such, a user can move or rotate the display about the hinge connection 140B while the base 32 and mounting arm 34 remain fixed or unchanged.

As best shown in FIGS. 1 and 3, the carrier 30 has a mechanism for providing rotation with respect to the mounting arm 34. Rotation can be established between the mounting arm 34 and display 14 and/or carrier 30 in a variety of ways. As one example, the carrier 30 can include a disk 170 that is housed in a central portion of the body of the carrier. The disk 170 can be fixedly attached to part of the hinge connection 140B such that the display 14 and/or carrier 30 can rotate about the mounting arm 34. Further, the disk 170 can be adapted to provide 90° of rotation so the display and/or carrier can rotate between landscape and portrait positions.

Figure 13:
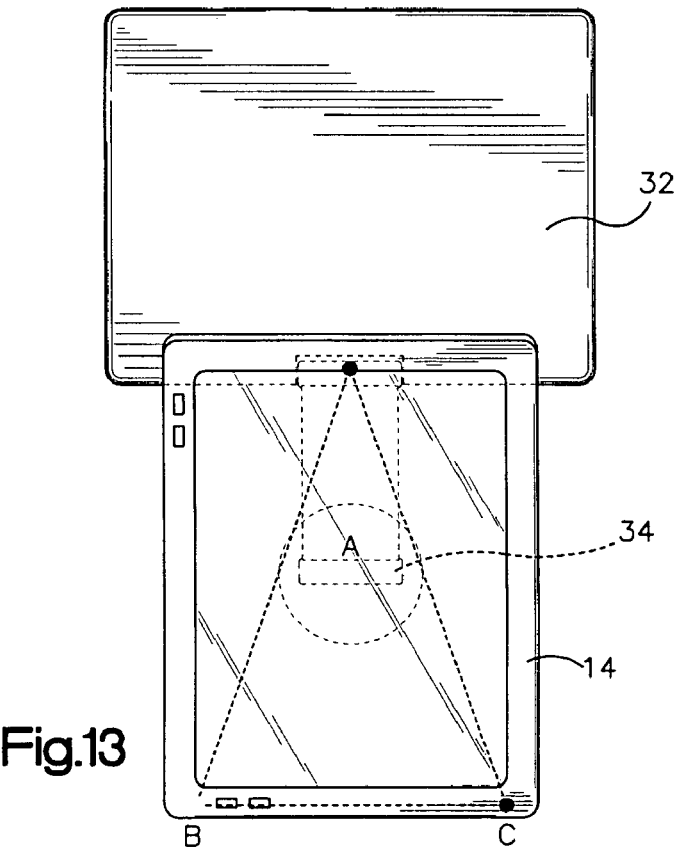
FIG. 13 is a top view of the computer of FIG. 10.

FIGS. 4 and 5 illustrate two different down or horizontal positions. FIG. 4 illustrates the display 14 in a down portrait position with respect to the base 32. In this position, the display 14 or carrier 30 does not contact the mounting arm 34. Instead, the display 14 contacts the support surface 150 and the top surface of the base 32 at or near the hinge connection 140A. Looking also to FIG. 13, the contact points or locations between the display 14 and support surface 150 and base 32 form a triangular orientation. Specifically, the display contacts the base at a first point A and the support surface at or between points B and C. Together, points A, B, and C form a triangular support configuration. This configuration provides a secure and solid foundation for the display to rest on.

Figure 12:
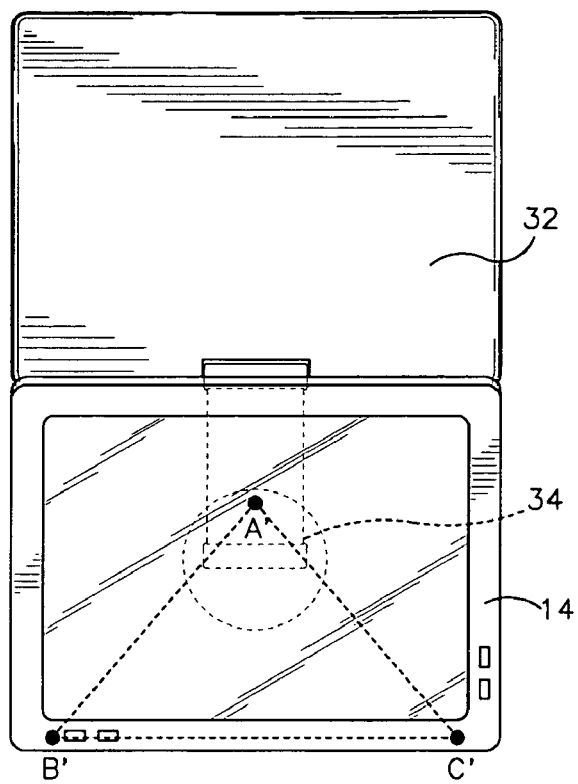
FIG. 12 is a top view of the computer of FIG. 11.

FIG. 5 illustrates the display 14 in a down landscape position with respect to the base 32. In this position, the display 14 or carrier 30 contacts the mounting arm 34 in a single location 174 along the curvature of the first portion 106. The display 14 also contacts the support surface 150. Looking also to FIG. 12, the contact points or locations between the display 14 and support surface 150 and mounting arm 34 form a triangular orientation. Specifically, the display contacts the mounting arm at a first point A' and the support surface at or between points B' and C'. Together, points A', B', and C' form a triangular support configuration. This configuration provides a secure and solid foundation for the display to rest on.

As noted, embodiments in accordance with the present invention can be utilized with various computing devices or systems. As one example, the docking station 12 and keyboard 16 may be optional or not utilized. FIGS. 8-11 illustrate one such alternate embodiment. In this embodiment, a computer 200 (such as a portable computer) generally comprises a base 202 connected to a display 204 via a mounting arm 206. The base 202, display 204, and mounting arm 206 can be generally similarly configured to the base 32, display 14, and mounting arm 34, respectively, shown and discussed in connection with FIGS. 1 and 2. As one difference, the mounting arm 206 can directly connect to the display and then function as described and discussed in the preceding figures. For example, the back surface 210 (FIGS. 8 and 9) of display 204 can comprise the hinge connection 212 and rotational mechanism 214 (as similarly discussed in connection with hinge connection 140B and disk 170).

Figure 8:
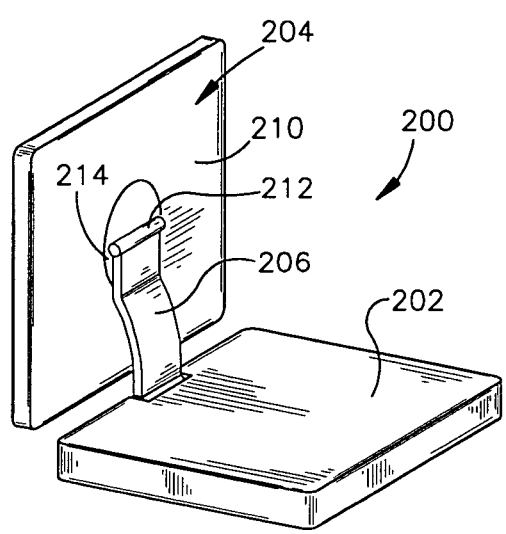
FIG. 8 is a side view of a computer with a display in an up landscape position.
Figure 9:
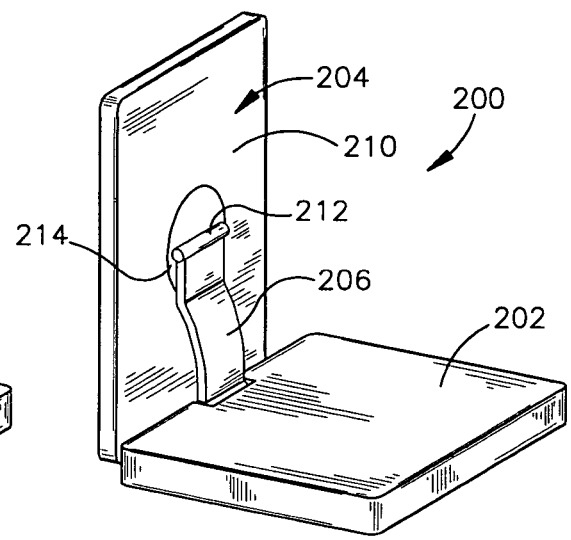
FIG. 9 is a side view of a computer with a display in an up portrait position.
Figure 10:
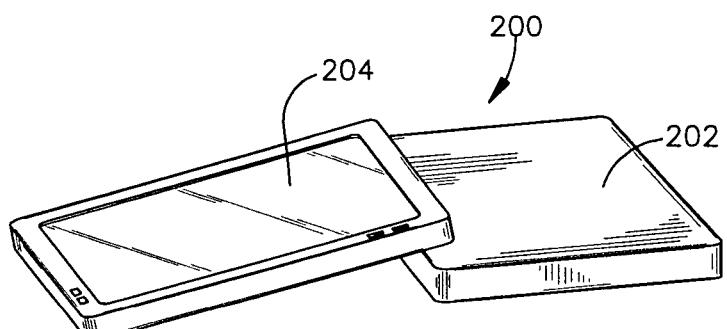
FIG. 10 is a side view of a computer with a display in a down landscape position.
Figure 11:
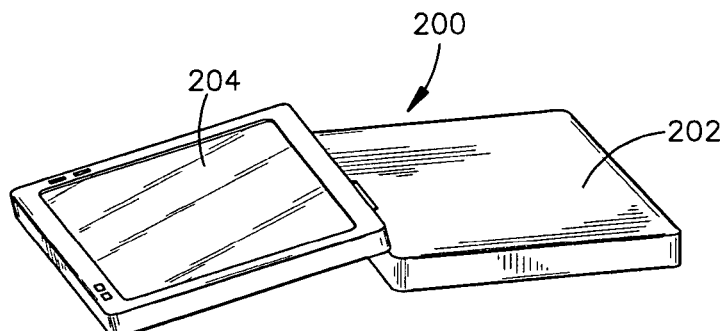
FIG. 11 is a side view of a computer with a display in a down portrait position.

FIG. 8 shows the computer 200 with the display 204 in an up landscape position. FIG. 9 shows the computer 200 with the display 204 in an up portrait position. FIG. 10 shows the computer 200 with the display 204 in a down portrait position. FIG. 11 shows the computer 200 with the display 204 in a down landscape position.

While the invention has been disclosed with respect to a limited number of embodiments, those skilled in the art will appreciate, upon reading this disclosure, numerous modifications and variations. It is intended that the appended claims cover such modifications and variations and fall within the true spirit and scope of the invention.

What is claimed is:

1. A computing system, comprising:
   a docking station having a base, a carrier separate from the base, and a nonlinear rigid mounting arm mechanically connecting the base to the carrier, wherein the mounting arm has a first end that pivotally connects to the base and a second end that pivotally connects to the carrier;
   an electronic display removably connectable to the carrier; and
   a keyboard in communication with the display, wherein the mounting arm has a curved portion that abuts and supports the display in a horizontal position and a straight portion that abuts and supports the display in a vertical position.

2. The computing system of claim 1 wherein the first end pivots about the base with a first rotational force, the second end pivots about the carrier with a second rotational force, and wherein the first rotation force is greater than the second rotational force.

3. The computing system of claim 1 wherein the mounting arm has an S shape in side view.

4. The computing system of claim 1 wherein the mounting arm is a single integrally formed member.

5. The computing system of claim 1 wherein the mounting arm is hollow and electrically couples the base to the display when the display is connected to the carrier.

6. The computing system of claim 1 wherein the display, while connected to the carrier, is movable between at least four different positions comprising a horizontal landscape position, a horizontal portrait position, an upright landscape position, and an upright portrait position.

7. A portable computer, comprising:
   a base having a central processing unit and memory;
   a display having a screen, wherein the display is movable between a horizontal position with respect to the base and a vertical position with respect to the base; and
   an elongated mounting arm mechanically and electrically coupling the display to the base, wherein the mounting arm has a curve portion that abuts the display to horizontally supports the display and a straight portion that abuts the display to vertically supports the display above a support surface.

8. The portable computer of claim 7 wherein the mounting arm rotationally connects at a first end to the base and rotationally connects at a second end to the display.

9. The portable computer of claim 7 wherein the base further comprises a stop mechanism to limit movement of the mounting arm about the base while the display is in the vertical position.

10. The portable computer of claim 7 wherein the display is adapted to function as a notepad while in the horizontal position and a view screen while in the vertical position.

11. The portable computer of claim 7 wherein the display abuts the support surface and the curved portion when the display is being horizontally supported.

12. A method, comprising:
   providing a computer base housing electronic components;
   providing a computer display housing electronic components;
   mechanically attaching the base to the display with a curved mounting arm;
   adjusting the display to a vertical position such that the display abuts a straight portion of the curved mounting arm and a center of gravity of the display is between a first pivot point at the base and a second pivot point at the display; and
   adjusting the display to a horizontal position such that the display is supported on the support surface and the curved mounting arm but not the computer base.

* * * * *

UNITED STATES PATENT AND TRADEMARK OFFICE
CERTIFICATE OF CORRECTION

PATENT NO. : 7,492,579 B2 Page 1 of 1
APPLICATION NO. : 10/661717
DATED : February 17, 2009
INVENTOR(S) : Steven S. Homer et al.

It is certified that error appears in the above-identified patent and that said Letters Patent is hereby corrected as shown below:

In column 8, line 3, in Claim 7, delete "curve" and insert -- curved --, therefor.

In column 8, line 4, in Claim 7, delete "supports" and insert -- support --, therefor.

In column 8, line 5, in Claim 7, delete "supports" and insert -- support --, therefor.

Signed and Sealed this

Second Day of June, 2009

JOHN DOLL
*Acting Director of the United States Patent and Trademark Office*